United States Patent [19]

Lobastov

[11] 4,413,814
[45] Nov. 8, 1983

[54] INITIATING CONE

[76] Inventor: George S. Lobastov, 495 - 45th Ave., San Francisco, Calif. 94121

[21] Appl. No.: 252,998

[22] Filed: Apr. 10, 1981

[51] Int. Cl.³ .................... B23K 7/00; B24C 1/00; C21D 1/82
[52] U.S. Cl. ...................... 266/251; 29/33 A; 29/421 E; 72/56; 266/252; 266/261
[58] Field of Search ............. 29/33 A, 33 R, 421 E, 29/81 K; 72/56, 706; 266/249, 251, 252, 261

[56] References Cited

U.S. PATENT DOCUMENTS

| 3,195,334 | 7/1965 | Filler | 72/56 |
| 3,236,080 | 2/1966 | Illgen | 72/56 |
| 3,645,521 | 2/1972 | Geen et al. | 72/56 X |
| 3,666,252 | 5/1972 | Rice | 266/249 |
| 3,901,488 | 8/1975 | Riddle | 266/249 X |
| 4,025,062 | 5/1977 | Johnstone et al. | 266/251 |

Primary Examiner—Z. R. Bilinsky
Attorney, Agent, or Firm—Limbach, Limbach & Sutton

[57] ABSTRACT

An apparatus and method for removing burrs and other roughage from stamped, milled and cast metallic articles. A conical combustion chamber is provided with a spiral groove which creates a turbulent flow for an ignited combustible mixture, which turbulence transforms the process from combustion to detonation. The detonated gaseous mixture is directed down the conical combustion chamber in expanding fashion to the articles which are to be de-burred, which articles are stored in a receptacle in axial alignment with the conical-shaped combustion chamber. During detonation, the burrs and other roughage are removed from the articles, while the remainder of each article is kept in tact.

5 Claims, 3 Drawing Figures

INITIATING CONE

BACKGROUND OF THE INVENTION

The present invention is directed to a detonation device for removing roughage and burrs from metallic elements which have been cast, stamped, or milled. During the process of casting, stamping and milling metallic articles, it is very often the case that unwanted rough areas, called burrs, are left on the finished product, which are detrimental to the end-use function of the product.

A method of removing this roughage from the finished product has employed a detonation device in which a combustible gas is ignited and caused to detonate, which detonation is directed to the articles contained in a receptacle. Such detonation will cause the separation of burrs and other roughage from the finished product, while doing no damage to the rest of the metallic article. Such de-burring has, hitherto, been one of inconsistency in that very often the combustion will not progress to the detonation stage, so that the roughage is still left on the article.

To overcome this unreliable method of removing burrs, manual techniques have been used, which are time consuming and costly, and often lead to non-standardized end products.

SUMMARY OF THE INVENTION

It is, therefore, the primary object of the present invention to provide an automatic de-burring method and apparatus which is safe and reliable, and which will ensure that a detonation of a combustible mixture will occur during every firing of the apparatus.

To this end, the de-burring apparatus of the present invention is provided with a storage receptacle in which is placed the metallic articles which are to be de-burred, or to have their roughage removed. The receptacle has a hollow interior of circular cross-section, and is overlaid with a combustion chamber casing having a truncated conical shape. The combustion chamber has a hollow conically-shaped cavity in which is supplied a mixture of combustible gas, such as hydrogen-oxygen, propane-oxygen and the like. At the top portion of the conical casing, a spark plug is provided for igniting the combustible mixture. The wall surface defining the hollow cavity of the combustion chamber casing is provided with a spiral copper wire in a first embodiment of the invention, which spiral wire causes the ignited gaseous mixture to flow in a turbulent manner so that the combustion will progress to a detonation.

It is known that combustion will lead to detonation if a sufficient degree of turbulence is created during the combustion process. In the present invention, the reaction products will flow turbulently, and, shortly after ignition, cause a detonation to occur throughout the remainder of the process.

In the second embodiment of the invention, the spiral copper wire is replaced by a spiral groove formed in the wall surface defining the hollow conically-shaped combustion chamber.

In either embodiment, the conical shape of the combustion chamber ensures that the detonation will propagate stably, while the spiral groove or spiral wire will ensure that the ignition of the combustible mixture will progress to a detonation.

BRIEF DESCRIPTION OF THE DRAWING FIGURES

The invention will be more readily understood with reference to the accompanying drawing, wherein FIG. 1 is a perspective view of the detonating device for metallic articles of the present invention;

DETAILED DESCRIPTION OF THE PREFERRED EMBODIMENT

Figure 1:
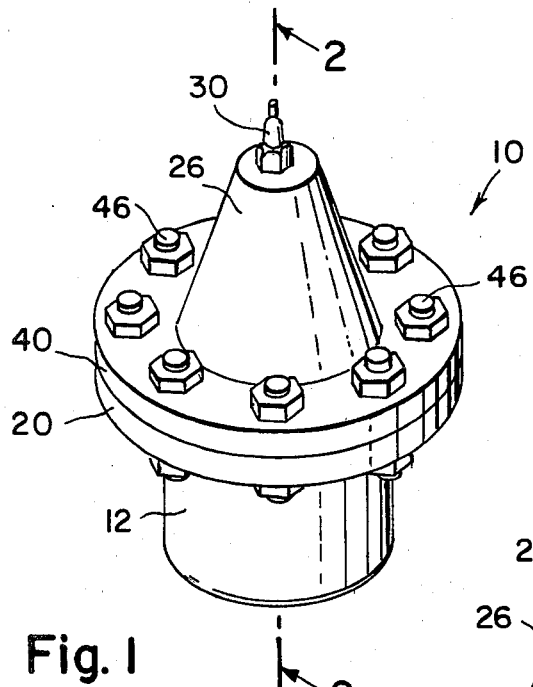
Figure 2:
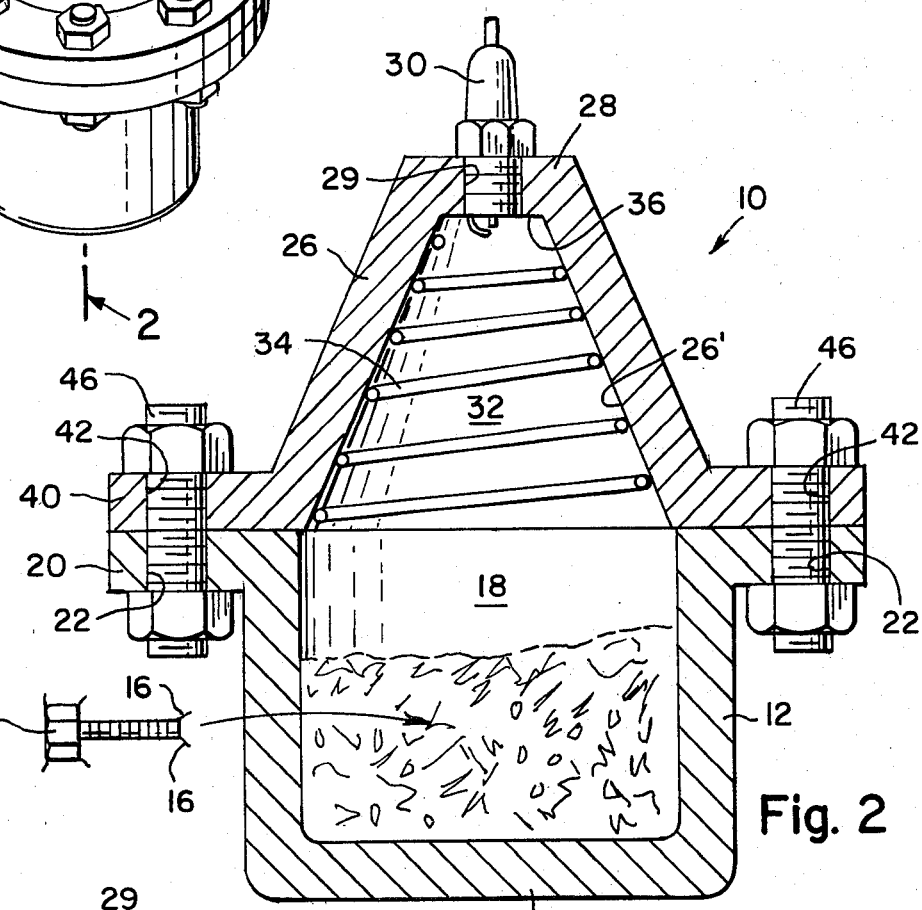
FIG. 2 is a cross-sectional view taken along line 2—2 of FIG. 1.

Referring now to the drawing, and in particular FIGS. 1 and 2, the detonation device for metallic articles is shown and generally represented by reference numeral 10. The apparatus according to the present invention has a storage receptacle 12 made of steel, or the like, in which is stored metallic articles, such as screws 14, which have undesirable roughage, or burrs, 16 which must be removed for a complete and useful end product. The storage receptacle 12 is preferably of circular cross-section and defines therein a hollow interior 18 which stores the metallic articles 14. At the upper end of the storage receptacle 12 is a circular flange, or lip, 20 formed integral with the rest of the receptacle 12, and which is provided with a plurality of openings 22. The hollow interior 18 extends from the bottom surface 12' of the receptacle upwardly to provide an opening at the upper end thereof for fluid communication with an opening formed in a combustion chamber casing, generally indicated by reference numeral 26.

The combustion chamber casing 26, made of steel or the like, is frusto-conical in shape, and has an upper truncated portion 28 in which is formed a threaded opening 29 for reception therein of a spark plug 30 of conventional design. The combustion chamber casing 26 has formed therein a frusto-conical hollow cavity 32 in which is provided a combustible gas mixture, such as hydrogen-oxygen, propane-oxygen, gasoline-air, or the like, which is ignited by the spark plug 30. Affixed along the inner wall surface 26' of the combustion chamber casing is a spiral copper wire 34 which extends in spiral fashion downwardly from adjacent the upper truncated portion 28 to the lower opened portion of the hollow cavity 32. The number of turns of the spiral may vary, but typically is such that a spacing of 10 mm. exists between the center of each adjacent corresponding turn when the length of the hollow cavity 32 from the upper end to the lower end is 120 mm. Typically, a copper wire having a diameter of 5 mm. is used, so that the channel formed between corresponding and adjacent portions of the spiral loops has a width of approximately 5 mm. at its narrowest center portion, with the width thereof expanding outwardly in concave fashion from the center. In a typical embodiment of the casing 26, the apex angle of the cone is 60 degrees, with the width of the inner wall surface of the truncated portion, indicated by reference numeral 36, being approximately 20 mm. According to extensive test done on the device, it has been found that a length of more than 120 mm. for the hollow cavity 32 is required, though the use of a shorter hollow cavity being within the scope of the present invention.

The combustion chamber casing 26 is provided with a circular flange, or lip, 40 similar to flange 20. Flange

40 is also provided with a plurality of openings 42 which align with the openings 22 of the flange 20 so that the two flanges may be secured together by bolts 46 in a conventional manner, as can be seen in FIG. 1.

The diameter of the hollow interior 18 of the receptacle 12 is approximately equal to the diameter of the hollow cavity 32 at the lowermost end thereof, so that there is a continuous air space between the metallic articles 14 and the combustible mixture contained in the combustion chamber 32 and the portion of the receptacle's hollow interior 18 which is not filled with the metallic articles. The central axes of the hollow cavity 32 and hollow interior 18 are coaxially aligned, as seen in FIG. 2.

When the spark plug 30 ignites the combustible mixture within the chamber 32 and the hollow interior 18, initial combustion takes place. Due to the spiral formed by the copper wire 34, a turbulent flow is created during this combustion process, which turbulent flow causes a detonation of the gases to occur very shortly after initial ignition. The cone-shaped hollow combustion cavity 32 ensures that the detonation will progress steadily and stably, while the detonation itself is ensured by the turbulent flow caused by the spiral channel formed between the loops of the spiral wire. As the detonation progresses, it finally reaches the lower portion of the hollow interior 18 of the storage receptacle 12, in which are stored the metallic articles which are to have their roughage removed by the rapid detonation. After the detonation, the flanges may be loosened and separated, and the de-burred metallic articles removed.

Figure 3:
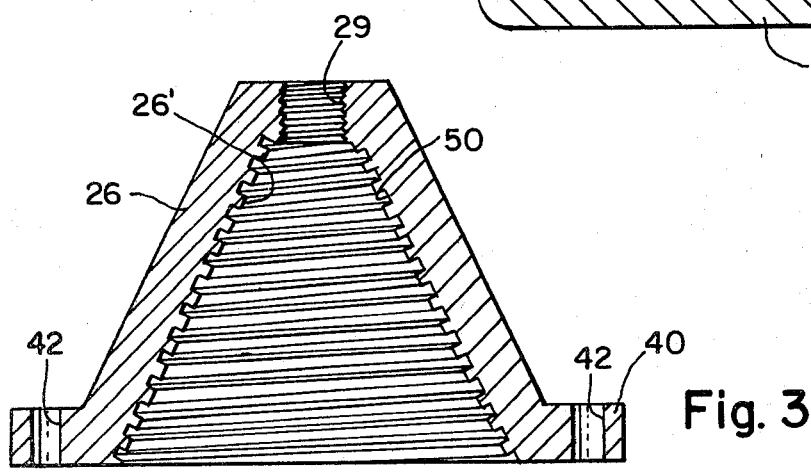
FIG. 3 is a cross-sectional view of a modified form of the invention.

In FIG. 3, a modified form of the combustion chamber is shown. Instead of the use of the spiral wire, a spiral groove 50 is formed in the wall surface 26' which provides the same kind of turbulent flow as that of the spiral wire 34. In this form of the invention, the width of the groove of the spiral is preferably 5 mm. and is of rectangular cross-section.

In each form of the invention, initial progression of the combustion extends along a hemispherical front, which almost immediately thereafter will convert to the detonation, due to the turbulent flow caused by either the spiral copper wire or spiral groove formed in the chamber wall.

While specific embodiments of the invention have been shown and described, it is to be understood that numerous changes and modifications may be made without departing from the scope and spirit of the invention as defined in the appended claims. For example, while the threaded opening in the truncated portion 28 of the casing 26 may also be used to supply the interior of the hollow cavity and hollow interior with the combustible gas mixture, and additional separate opening may be provided solely for this gas-supplying function.

What is claimed is:

1. A detonation device for removing burrs from metallic articles comprising:
    a receptacle having an open upper end and a hollow interior for receiving the metallic articles;
    a combustion chamber casing, connectable to the open upper end of said receptacle in sealing engagement therewith, said casing having a hollow cavity in communication with the interior of said receptacle, said cavity having a generally frusto-conical configuration with the interior surface of said cavity being formed with a spiral pattern; and
    ignition means mounted adjacent the upper end of said cavity for igniting a combustible material introduced into said cavity, whereby in operation, the configuration of the inner surface of said cavity functions to enhance detonation of said combustible material to aid in the removal of burrs from the metallic articles held in the receptacle.

2. A detonation device as recited in claim 1 wherein said spiral pattern is defined by a spiral groove formed in the surface of the hollow cavity along the length thereof.

3. A detonation device as recited in claim 1 wherein said spiral pattern is defined by a spiral wire extending about the circumference of the cavity wall surface along the length thereof.

4. A detonation device as recited in claim 3 wherein said spiral wire is formed from copper.

5. A detonation device as recited in claim 1 wherein the upper end of said receptacle includes an outwardly projecting circumferential flange, and wherein the lower end of said chamber casing includes a complementary, outwardly projecting circumferential flange, said flanges being disposed in abutting relationship and fixedly connected together for mounting said receptacle and chamber casing in sealing engagement.

* * * * *